United States Patent
Yang et al.

(10) Patent No.: US 12,165,210 B2
(45) Date of Patent: Dec. 10, 2024

(54) DISTRIBUTED PROCESSING TO PROVIDE TRANSPARENCY IN RATE DETERMINATION

(71) Applicant: Allstate Insurance Company, Northbrook, IL (US)

(72) Inventors: Kevin Yang, Fremont, CA (US); Hruday Kamble, Roseville, CA (US); Avinash Gupta, Roseville, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/787,134

(22) Filed: Feb. 11, 2020

(65) Prior Publication Data

US 2021/0217095 A1    Jul. 15, 2021

Related U.S. Application Data

(63) Continuation of application No. 16/742,858, filed on Jan. 14, 2020, now abandoned.

(51) Int. Cl.
*G06Q 40/08* (2012.01)
*G06Q 30/02* (2023.01)
*G06Q 30/0201* (2023.01)

(52) U.S. Cl.
CPC ......... *G06Q 40/08* (2013.01); *G06Q 30/0206* (2013.01)

(58) Field of Classification Search
CPC ............................ G06Q 40/08; G06Q 30/0206
USPC .......................................................... 705/4
See application file for complete search history.

(56) References Cited

U.S. PATENT DOCUMENTS

| | | | |
|---|---|---|---|
| 6,182,048 B1 | 1/2001 | Osborn et al. | |
| 7,389,246 B1 | 6/2008 | Ohrt | |
| 7,769,608 B1 | 8/2010 | Woll et al. | |
| 8,103,526 B1 | 1/2012 | Pallesen et al. | |
| 8,688,483 B2 | 4/2014 | Watts et al. | |
| 8,793,146 B2 | 7/2014 | Bonissone et al. | |
| 9,953,372 B1 | 4/2018 | Dziabiak et al. | |
| 9,996,884 B2 | 6/2018 | Collopy et al. | |
| 10,062,121 B2 | 8/2018 | Besman et al. | |
| 10,262,373 B2 * | 4/2019 | Hayward et al. | G06Q 40/08 |
| 10,276,263 B2 | 4/2019 | Connely, IV et al. | |
| 10,373,259 B1 | 8/2019 | Konrardy et al. | |

(Continued)

OTHER PUBLICATIONS

How Dubbo-Based Microservices Are Used in Insurance Companies, Nov. 20, 2019, Alibaba Cloud, pp. 1-11. (Year: 2019).*

(Continued)

*Primary Examiner* — Scott C Anderson
*Assistant Examiner* — George N. Proios
(74) *Attorney, Agent, or Firm* — Polsinelli PC

(57) ABSTRACT

Methods and systems disclosed herein describe deploying a plurality of microservices to calculate an insurance rate. The plurality of microservices may operate in parallel to calculate a plurality of partial rates that are combined (e.g., added up) to determine the insurance rate. During the calculating steps, one or more rating factors may be cached and/or stored. The plurality of microservices may reduce the time and/or resources required by a processor to calculate an insurance rate, while the stored rating factors may be displayed to the user to provide greater transparency into how the insurance rate was calculated.

17 Claims, 6 Drawing Sheets

(56) References Cited

U.S. PATENT DOCUMENTS

| | | |
|---|---|---|
| 2002/0091550 A1 | 7/2002 | White et al. |
| 2002/0188480 A1 | 12/2002 | Liebeskind et al. |
| 2003/0093302 A1 | 5/2003 | Quido et al. |
| 2010/0010836 A1* | 1/2010 | Rosen et al. .......... G06Q 40/00 705/4 |
| 2013/0046562 A1 | 2/2013 | Taylor et al. |
| 2013/0325488 A1 | 12/2013 | Carter et al. |
| 2014/0095214 A1* | 4/2014 | Mathe et al. .......... G06Q 40/08 705/4 |
| 2014/0136242 A1 | 5/2014 | Weekes et al. |
| 2014/0365246 A1* | 12/2014 | Hayward et al. ...... G06Q 40/08 |
| 2015/0317703 A1 | 11/2015 | Kharraz Tavakol |
| 2016/0225093 A1 | 8/2016 | Le |
| 2016/0232616 A1 | 8/2016 | Le |
| 2017/0011318 A1 | 1/2017 | Vigano et al. |
| 2018/0218452 A1 | 8/2018 | Guensler et al. |
| 2018/0336638 A1* | 11/2018 | Dziabiak et al. ...... G06Q 40/08 |
| 2018/0336639 A1 | 11/2018 | Dziabiak et al. |
| 2018/0336640 A1* | 11/2018 | Dziabiak et al. ...... G06Q 40/08 |
| 2018/0336641 A1* | 11/2018 | Dziabiak et al. ...... G06Q 40/08 |
| 2019/0050770 A1 | 2/2019 | Galvin et al. |
| 2019/0311438 A1 | 10/2019 | Hibler et al. |
| 2020/0104938 A1* | 4/2020 | Gorojovsky et al. .. G06Q 40/08 |

OTHER PUBLICATIONS

Sep. 7, 2019, "Use of Open Data to Improve Automobile", Angel Blesa, International Journal of Market Research, 21 pages.

No Date, "Introducing the New RS X Rating Platform." The Groundbreaking Rating Platform at the Core of the DRC Technology Ecosystem., 8 pages.

Nov. 20, 2019, "How Dubbo-Based Microservices Are", Alibaba Cloud, pp. 1-11.

No date, "The Solartis Rating Microservice Differences", 1 page.

Dec. 6, 2019, "These 7 Factors Determine Care Insurance Premiums", Know the Factors Affecting Care Insurance Premiums, as changes may keep costs down. pp. 1-3.

Jun. 18, 2015, "How Age, Gender, and Other Factors," Leavitt Group, pp. 1-4.

Jun. 29, 2019, "13 Things That Affect Your Care Insurance", Penny Gusner, pp. 1-10.

Mar. 31, 2021—(WO) International Search Report & Written Opinion—PCT/US21/012402.

Co-pending U.S. Appl. No. 16/742,858, inventor Kevin; Yang, filed Jan. 14, 2020.

\* cited by examiner

DISTRIBUTED PROCESSING TO PROVIDE TRANSPARENCY IN RATE DETERMINATION

CROSS-REFERENCE TO RELATED APPLICATIONS

This application is a continuation of co-pending U.S. application Ser. No. 16/742,858, filed on Jan. 14, 2020 and entitled "Distributed Processing to Provide Transparency in Rate Determination," the entirety of which is herein incorporated by reference in its entirety.

FIELD OF USE

Aspects of the disclosure relate generally to rate calculations and, more specifically, to deploying a plurality of microservices to determine rate calculations using parallel processing.

BACKGROUND

Insurance rates are calculated by monolithic, black boxes. That is, a user provides information and the insurance provider, in return, provides a rate without any additional information about how that rate was calculated. Users are oftentimes left wondering how the insurance provider determined the quoted rate. Moreover, rate calculators require significant downtime for upgrades due to their black box nature. In this regard, a single change to the rate calculation may result in the rate calculator being unavailable for an extended period of time. Thus, there is a need to provide more transparency when calculating insurance rates while allowing greater flexibility to update one or more factors in how insurance rates are calculated.

Aspects described herein may address these and other problems, and generally improve the efficiency and performance of rate calculations.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Example methods and systems described herein disclose calculating an insurance rate using a plurality of microservices. The microservices may execute in parallel to calculate a plurality of partial rates, which are aggregated to determine the insurance rate. Throughout the calculation process, various factors may be cached and, subsequently, stored in a persistent memory. The plurality of microservices improves the overall performance of the computer by reducing the amount of time and resources a processor requires to calculate an insurance rate. Additionally, individual microservices may be updated, modified, and/or changed individually without having to take the entire insurance rate calculation application offline. Moreover, caching and storing the rating factors may provide greater transparency into how an insurance rate was calculated.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for deploying a plurality of microservices to calculate an insurance rate. The plurality of microservices may execute in parallel to determine a partial rate. That is, each of the microservices may calculate a partial rate based on one or more factors (e.g., rating factors) determined by the user inputs. The plurality of partial rates may be combined (e.g., added up) to determine the insurance rate provided to the user. The plurality of microservices may reduce the time and/or resources required by a processor to calculate an insurance rate. Moreover, the use of individual microservices may provide greater flexibility to update how the insurance rate is calculated. Additionally, aspects discussed herein may relate to methods and techniques for caching and/or storing a number of factors (e.g., the rating factors) that impacted the calculated insurance rate. The stored factors may be displayed to the user to provide greater transparency into how the insurance rate was calculated. By providing greater transparency into how a rate was determined, users may be able to make adjustments and/or changes to lower their insurance rate and have a better understanding of what factors contributed most to their insurance rate.

Figure 1:
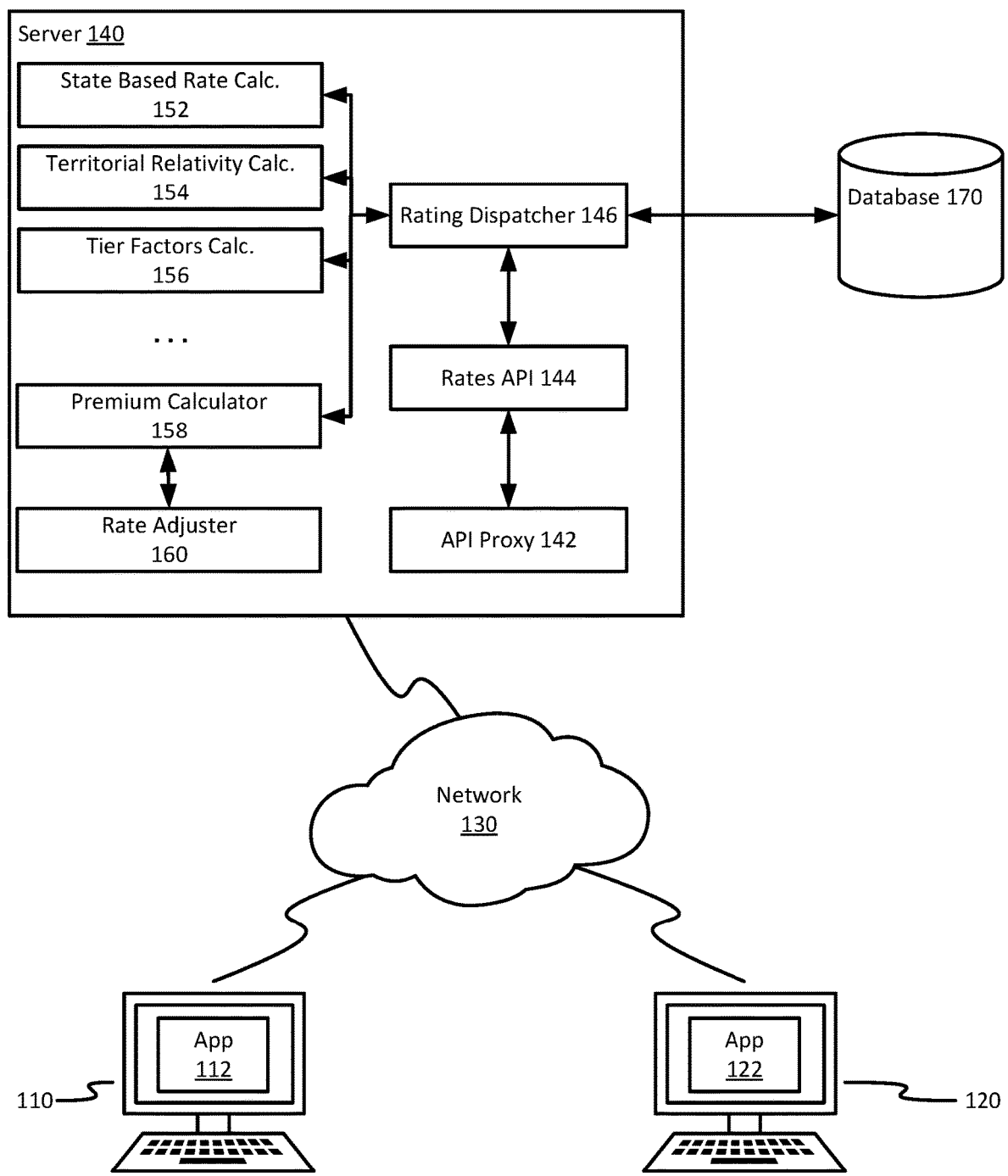
FIG. 1 shows an example of a system in which one or more aspects described herein may be implemented.

Turning to FIG. 1, a system 100 in which one or more microservices may be deployed is shown. System 100 may include a first computing device 110 and a second computing device 120 interconnected to a server 140 via network 130. Additionally, server 140 may be connected to a database 170.

First computing device 110 may be any suitable computing device configured to perform the particular functions described herein. For example, first computing device 110 may be a mobile device, such as a cellular phone, a mobile phone, a smart phone, a tablet, or a laptop, and/or a personal computer, such as a terminal computing device, a desktop computing device, etc. First computing device 110 may provide a first user with access to a variety of applications and services. For example, first computing device 110 may provide the first user with access to the Internet. Additionally, first computing device 110 may provide the first user with one or more applications located thereon, including, for example, application 112. The one or more applications may provide the first user with a plurality of tools and access to a variety of services. For instance, application 112 may be a web browser that provides the first user with access to the Internet. The web browser may allow the first user to access one or more webpages, such as an insurance web page. On the insurance web page, the first user may be able to receive one or more rate quotes, insurance policies, etc. In this regard, the insurance web page served to the first user via application 112 may include one or more inputs to collect data and/or information from the first user. Application 112 may determine whether the one or more inputs comply with a canonical model. When the one or more inputs do not comply with the canonical model, application 112 may transform the one or more inputs to ensure compliance with the canonical model. This transformation may ensure that the one or more inputs are properly handled during the rate calculation. The information may be transmitted to server 140 via network 130. As will be discussed in greater detail below, server 140 may process the data and/or information provided by the first user to generate one or more outputs. These one or more outputs may include, for example, one or more rate quotes, insurance policies, etc. Server 140 may return the one or more outputs to application 112. If the one or more outputs adhere to the canonical, first application 112 may transform them from the canonical model into a format suitable for the first application 112. The first application 112 may then provide the output (e.g., rate quote) to the user.

Second computing device 120 may be similar to the first computing device 110 discussed above. In this regard, the second computing device 120 may include any suitable computing device configured to allow a user to execute software for a variety of purposes as described herein. Second computing device 120 may belong to or be associated with the first user that accesses first computing device 110, or, alternatively, second computing device 120 may belong to or be associated with a second user, different from the first user. The software of second computing device 120 may include one or more web browsers that provide access to websites on the Internet. Additionally, or alternatively, second computing device 120 may include an application 122. In some embodiments, application 122 may be an application used by a professional in the performance of their duties. For example, application 122 may be an insurance program configured to allow an insurance agent to provide quotes, insurance policies, etc. to clients. In this regard, an agent may enter one or more inputs into application 122. The one or more inputs may include data and/or information provided by the client. Application 122 may transmit (e.g., send) the one or more inputs to server 140 for processing. In some instances, application 122 may determine whether the one or more inputs comply with a canonical model. When the one or more inputs do not comply with the canonical model, application 122 may transform the one or more inputs to ensure compliance with the canonical model. This transformation may ensure that the one or more inputs are properly handled during the rate calculation. Based on the inputs, server 140 may provide (e.g., respond) with one or more outputs, such as an insurance quote or an insurance policy. Like the input transformation discussed above, application 122 may transform the one or more outputs (e.g., calculated rates) from the canonical model into a format suitable for the second application 122. Application 122 may then provide the one or more outputs to the agent, who may, in turn, provide the one or more outputs to the client.

As noted above, server 140, and the applications, processing engines, and/or microservices executing thereon, may perform a variety of processing on behalf of one or more applications, including, for example, a rating engine platform. In this regard, server 140 may be any computing device capable of performing the methods, processes, and/or algorithms described herein. Server 140 may be a stand-alone server, a corporate server, or a server located in a server farm or cloud-computing environment. According to some examples, server 140 may be a virtual server hosted on hardware capable of supporting a plurality of virtual servers. In some embodiments server 140 may be a backend server for an insurance company. The backend server may be executing one or more applications (e.g., a rating engine platform) configured to calculate one or more insurance rates, generate one or more insurance products, and, otherwise, perform a plurality of insurance related tasks. The insurance rates may be generated based on, or in response to, rate quote requests from one or more users. The server 140 may include one or more applications configured to calculate insurance rates. The one or more applications may include a plurality of microservices (e.g., mini-applications, sub-routines, libraries, etc.) configured to calculate one or more rates used in determining a requested insurance rate. Additionally, the one or more applications may comprise an application programming interface (API) proxy 142, a rates API 144, and/or a rating dispatcher 146. API proxy 142 may be an interface that allows applications, such as first application 112 and/or second application 122, to communicate with one or more backend applications and/or services provided by server 142. In particular, API proxy 142 may communicate with rates API 144. Rates API 144 may provide user information to and receive quotes from the rating dispatcher 146. In this regard, rates API 144 may aggregate one or more user inputs received from applications (e.g., first application 112 and second application 122), via API proxy 142, and provide those one or more user inputs to the rating dispatcher 146. Rates API 144 may receive one or more insurance rates from rating dispatcher 146 and send the one or more insurance rates to one or more applications (e.g., first application 112 and second application 122), via API proxy 142.

Rating dispatcher 146 may be an application that orchestrates parallel calls (e.g., via a REST API) to one or more microservices. That is, each of the one or more microservices may perform partial rate calculations in parallel, which improves the overall performance of the computer by reducing the amount of time and resources a processor requires to calculate an insurance rate. In some instances, the rating dispatcher 146 may perform load balancing amongst the one or more microservices. As noted above, each of the one or more microservices may be an application, sub-routine, library, or the like configured to calculate a partial rate. The one or more partial rates may be aggregated (e.g., summed up) to calculate a total insurance rate. In some embodiments, the one or more microservices may comprise a state-based rate calculator 152, a territorial relativity calculator 154, a tier factors calculator 156, a premium calculator 158, and/or a rate adjuster 160.

The state-based rate calculator 152 may be configured to calculate one or more state-based rates. The state-based rates may be calculated in accordance with state-specific insurance requirements. Additionally or alternatively, the state-based rate calculator may query a memory, such as a distributed cache, to determine whether to apply one or more persistent rating factors. Persistent rating factors may include user-specific rating factors previously used in determining an insurance rate for the user. The persistent rating factors may include state-specific rating factors that were previously used in determining an insurance rate for users from the same state. After calculating the partial rate based on state-specific factors, state-based rate calculator may provide a persistent rating factor to rating dispatcher 146, which may store the persistent rating factor in a memory, such as a distributed cache (not shown) or database 170.

The territorial relativity calculator 154 may be configured to calculate one or more partial rates based on geographical factors associated with the user. For example, these geographical factors may include the user's zip code, the zip code of where a vehicle is garaged, where the user works (e.g., to determine commuting distance), etc. As discussed above, the territorial relativity calculator 154 may query a memory, such as a distributed cache, to determine whether to apply one or more persistent rating factors. Once the partial rate has been calculated, territorial relativity calculator may provide a persistent rating factor used in determining the partial rate to rating dispatcher 146, which may store the persistent rating factor in a memory, such as a distributed cache (not shown) or database 170.

The tier factors calculator 156 may be configured to calculate one or more partial rates based on the user's driving history. The user's driving history may comprise past accidents, length of time driving, whether there was any lapse in coverage and, if so, for how long, etc. The tier factors calculator 156 may calculate the one or more partial rates based on the one or more received user inputs. Additionally or alternatively, the tier factors calculator may determine whether a previous rating factor exists by querying a memory. As noted above, the previous rating factor may be used in calculating the partial rate. After the partial rate has been calculated, tier factors calculator 156 may provide a persistent rating factor to rating dispatcher 146. The rating dispatcher 146 may store the persistent rating factor in a memory for later use. Additionally or alternatively, the persistent rating factor may be provided with the insurance rate to provide transparency into how the rate was determined.

The premium calculator 158 may be configured to aggregate the partial rates calculated by each of the one or more microservices to determine an insurance rate. That is, the premium calculator 158 may calculate the insurance rate based on the partial rates calculated by each of the one or more microservices. Additionally, the premium calculator may communicate with rate adjuster 160 to determine whether any discounts, caps, and/or other adjustments should be made to the calculated rate. Once any adjustments are applied, the premium calculator 158 may provide the final insurance rate to rating dispatcher 146, which may store the rate and the factors that contributed to the rate calculation in the memory (e.g., a distributed cache and/or database 170). As noted above, the rating dispatcher may transmit the final insurance rate to rates API 144, which may transform the insurance rate into a format suitable for the application that requested the rate. One or more rating factors may also be provided to the rates API. The one or more rating factors may also be transformed into the suitable format for the requesting application.

The rate adjuster 160 may be configured to adjust (e.g., modify, change, alter) the insurance rate calculated by premium calculator 158. In this regard, the rate adjuster 160 may apply a floor (e.g., a minimum) to the insurance rate. Additionally or alternatively, the price adjuster may cap (e.g., set a ceiling) for the insurance rate. In some instances, the rate adjuster 160 may apply any applicable discounts to the insurance rate, such as military discounts, discounts from bundling coverages, etc. Accordingly, the rate adjuster 160 may assist the premium calculator 158 in finalizing the insurance rate to be provided to the user.

It will be appreciated that the server 140 may use more, or fewer, microservices than those described above. By using microservices, the overall performance of the rate calculation system may be improved. In this regard, updates to the backend rating calculation may be performed quickly and without any, or minimal, down time. For example, a new microservice may be developed based on changes and/or updates to pertinent insurance law (e.g., state law). The new microservice may be deployed to backend rating calculation applications without having to update any other microservice and/or rating application. Additionally, the use of microservices may provide more transparency to end users in how their rate was calculated. For example, the microservices, and the partial rates they calculated, may provide more information about how the rate was determined and which of the factors most impacted the user's rate.

Database 170 may be configured to store information on behalf of server 140 and, in particular, rating dispatcher 146. The information may include, but is not limited to, the intermediate results (e.g., partial rates) calculated by each of the one or more microservices. By storing intermediate results, the one or more applications (e.g., the rating engine platform) may be able to trace and/or analyze how an insurance rate was calculated. First database 170 may include, but are not limited to relational databases, hierarchical databases, distributed databases, in-memory databases, flat file databases, XML databases, NoSQL databases, graph databases, and/or a combination thereof.

Network 130 may include any type of network. In this regard, network 130 may include the Internet, a local area network (LAN), a wide area network (WAN), a wireless telecommunications network, a corporate network, a distributed corporate network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, Wi-Fi, WiMAX and LTE, is presumed, and the various computing devices described herein may be configured to communicate using any of these network protocols or technologies. The data transferred to and from various computing devices in system 100 may include secure and sensitive data, such as confidential documents, customers' personally identifiable information (PII), and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
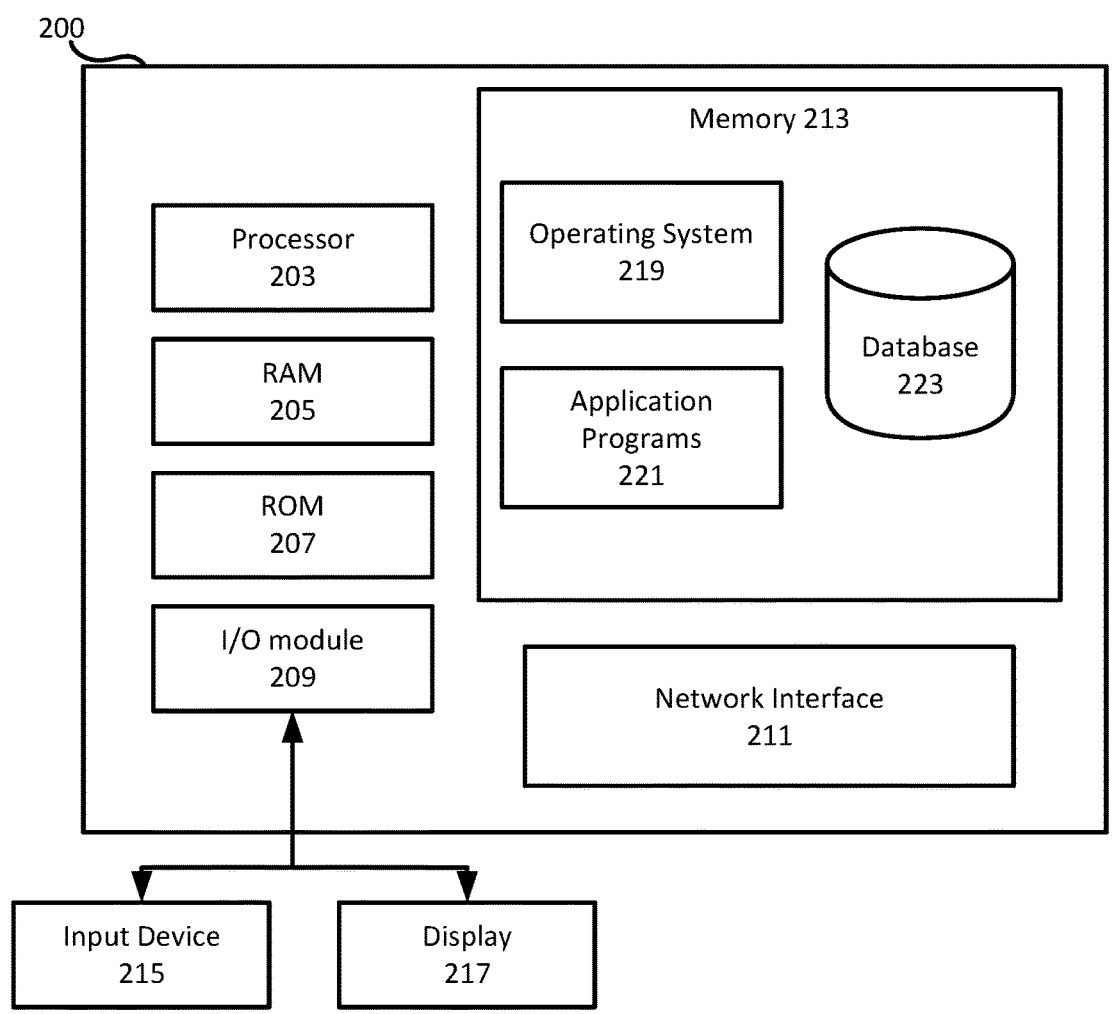
FIG. 2 shows an example of a computing device in accordance with one or more aspects described herein.

Any of the devices and systems described herein may be implemented, in whole or in part, using one or more computing systems described with respect to FIG. 2. FIG. 2 shows an example of a computing device 200. Computing device 200 may be similar to first computing device 110 and/or second computing device 120, discussed above. Additionally or alternatively, computing device 200 may be similar to server 140.

Computing device 200 may include one or more processors 203. Processor 203 may include a single central processing unit (CPU), which may be a single-core or multi-core processor. Alternatively, processor 203 may include multiple CPUs or a plurality of multi-core processors. Processor(s) 203 and associated components may allow the computing device 200 to execute a series of computer-readable instructions to perform some or all of the methods, processes, and/or algorithms described herein. Processor(s) 203 may be capable of controlling operations of computing device 200 and its associated components, including RAM 205, ROM 207, an input/output (I/O) module 209, a network interface 211, and memory 213. For example, processor(s) 203 may be configured to read/write computer-executable instructions and other values from/to the RAM 205, ROM 207, and memory 213.

The I/O module 209 may be configured to be connected to an input device 215, such as a microphone, keypad, keyboard, touchscreen, and/or stylus through which a user of the computing device 200 may provide input data. The I/O module 209 may also be configured to be connected to a display device 217, such as a monitor, television, touchscreen, etc., and may include a graphics card. The display device 217 and input device 215 are shown as separate elements from computing device 200; however, they may be within the same structure.

The memory 213 may be a computer-readable medium for storing computer-executable instructions (e.g., software). The instructions stored within memory 213 may enable computing device 200 to perform various functions, including the methods, processes, and/or algorithms described herein. For example, memory 213 may store software used by computing device 200, such as an operating system 219 and application programs 221, and may include an associated database 223.

Although not shown in FIG. 2, various elements within memory 213 or other components in computing device 200, may include one or more caches, for example, CPU caches used by the processing unit 203, page caches used by the operating system 219, disk caches of a hard drive, and/or database caches used to cache content from database 223. For embodiments including a CPU cache, the CPU cache may be used by one or more processors in the processor 203 to reduce memory latency and access time. In such examples, the processor 203 may retrieve data from or write data to the CPU cache rather than reading/writing to memory 213, which may improve the speed of these operations. In some examples, a database cache may be created in which certain data from a central database such as, for example, a database associated with server 140 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more servers 140. These types of caches and others may be included in various embodiments, and may provide potential advantages in certain implementations of retrieving and analyzing field data and/or local data, such as faster response times and less dependence on network conditions.

The network interface 211 may allow computing device 200 to connect to, and communicate with, a network, such as network 130. As noted above, network 130 may be any type of network, including a local area network (LAN) and/or a wide area network (WAN), such as the Internet, a cellular network, or satellite network. Through the network 130, computing device 200 may communicate with one or more other computing devices, such as server 140, to exchange insurance-related data and/or information. The network interface 211 may connect to the network (e.g., network 130) via communication lines, such as coaxial cable, fiber optic cable, etc., or wirelessly using a cellular backhaul or a wireless standard, such as IEEE 802.11, IEEE 802.15, IEEE 802.16, etc. Further, the network interface 211 may use various protocols, including TCP/IP, Ethernet, File Transfer Protocol (FTP), Hypertext Transfer Protocol (HTTP), etc., to communicate with other computing devices, servers 140, and the like.

Figure 3:
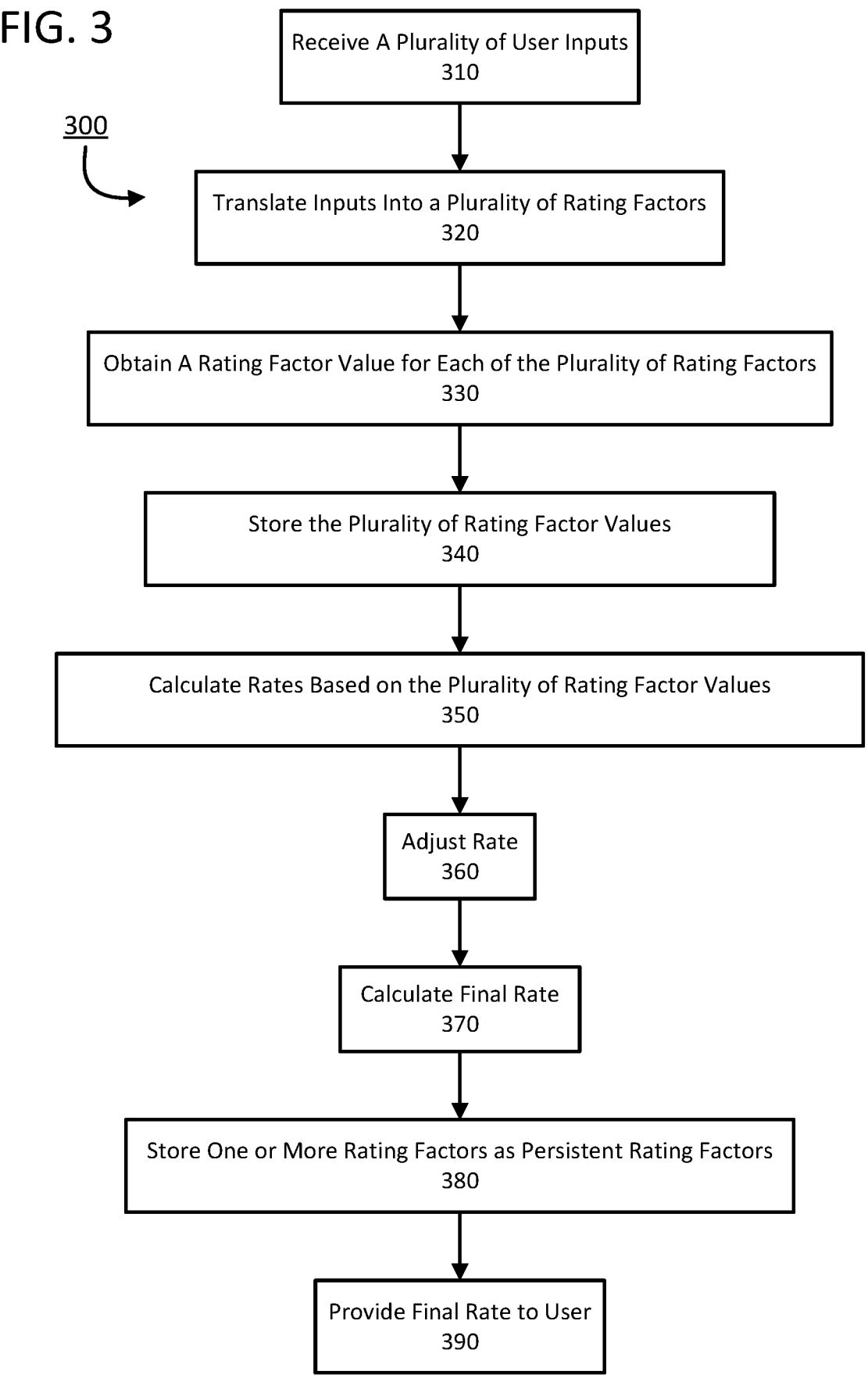
FIG. 3 shows an example of a flowchart for calculating an insurance rate using one or more microservices according to one or more aspects of the disclosure.

As noted above, users may request an insurance rate, for example, as part of a rate quote, to determine whether to purchase an insurance product. FIG. 3 shows a flow chart of a process 300 for calculating an insurance rate using one or more microservices according to one or more aspects of the disclosure. Some or all of the steps of process 300 may be performed using one or more computing devices, such as server 140.

In step 310, a server (e.g., one or more applications executing on server 140) may receive a plurality of user inputs. The plurality of user inputs may include user information, such as the user's name (e.g., first name, last name), address, date of birth, social security number, and/or other personally identifiable information (PII). In some embodiments, the user information may include employment information, such as place of employment, length of employment, etc. Additionally, the plurality of user inputs may also include an indication of the type of rate quote (e.g., home, life, auto, etc.) sought by the user. The user inputs may include additional information related to the type of rate quote sought by the user. For example, a request for an auto insurance quote may prompt the user to provide information about the user's vehicle(s), including make, model, year, mileage, etc. Similarly, a request for a life insurance quote may prompt the user to provide information related to their health.

In step 320, the server (e.g., one or more applications executing on server 140) may translate each of the plurality of user inputs into a plurality of rating factors. Each rating factor may correspond to one or more user inputs. A rating factor may comprise user information in a format configured to query a look-up table, such as a rate worksheet. The look-up table may be stored in a memory of the server. For example, a first rating factor may be the user's gender and a second rating factor may be the user's age. In step 330, the server may obtain a rating factor value for each of the plurality of rating factors. Rating factor values may be a number between 0 and 1 that is used to calculate a partial rate as described in greater detail below. In this regard, the server may query a look-up table, such as the rate worksheet, using each of the plurality of rating factors. For example, the server may submit the first rating factor (e.g., the user's gender) to obtain a first rating factor value associated with the user's gender. The server may submit the second rating factor (e.g., the user's age) to obtain a second rating factor value associated with the user's age. In step 340, the plurality of rating factor values may be stored in a memory. For example, the plurality of rating factor values may be stored in a cache, a distributed cache, and/or a data store, such as database 170 above.

In step 350, the server (e.g., one or more applications executing on server 140) may calculate one or more rates (e.g., partial rates) based on the plurality of stored rating factor values. In this regard, one or more microservices may obtain one or more rating factor values stored in the memory (e.g., the cache, distributed cache, and/or data store). The one or more rating factor values may be multiplied by a base rate to calculate the partial rate. For example, the territorial relativity calculator may have a base rate of $500. This may be a countrywide defined base rate. Alternatively, the base rate may be defined on a state-by-state or other geographical basis. The rating engine may determine that three rating factor are applicable when performing the territorial relativity calculation: the user's age, the user's gender, and the user's address. Each of the three rating factors may have a rating factor value associated therewith. For example, the user's age may have a first rating factor value of 0.06, the user's gender may have a second may have a second rating factor value of 0.03, and the user's address may have a rating factor value of 0.10. In determining a partial rate, the territorial relativity calculator may multiple the base rate (e.g., $500) by each of the rating factor values and add the outcomes of each operation. For example, the base rate ($500) may be multiplied by the first rating factor value (0.06), the second rating factor value (0.03), and the third rating factor value (0.10). The multiplication operation may produce three results: $30, $15, and $50. The three results may be summed up to produce a partial rate of $95. It will be appreciated that the example above is merely illustrative and simpler, or more complex, calculations may be performed to calculate the partial rate. Further, it will be appreciated that each of the one or more microservices may perform similar operations to calculate a partial rate. As noted above, the premium calculator may add up each of the partial rates from each of the one or more microservices to determine an insurance rate.

In step 360, the server (e.g., one or more applications executing on server 140) may adjust the insurance rate. As noted above, the premium calculator may communicate with a rate adjuster. The rate adjuster may apply a floor (e.g., a minimum) to the insurance rate. Additionally or alternatively, the price adjuster may cap (e.g., set a ceiling) for the insurance rate. The rate adjuster may apply discounts to the insurance rate, such as military discounts, discounts for bundling products and/or coverages, etc. The premium calculator may calculate a final rate in step 370, for example, based on the response and/or feedback provided by the rate adjuster.

In step 380, one or more rating factors may be stored as persistent rating factors. The persistent rating factors may comprise details about how each of the partial rates were calculated. The details may include the user information, the rating factor value, the partial rate calculated by each of the microservices, and/or any other pertinent information. In step 390, the final insurance rate may be provided to the user. In this regard, the final insurance rate may be sent (e.g., transmitted) to a user-side application, such as the first application 112 and/or the second application 122. Additionally or alternatively, providing the final insurance rate to the user may comprise displaying the final insurance rate for the user. In some embodiments, the final insurance rate may be provided to the user with an option to purchase an insurance product (e.g., a home policy, an auto policy, a life insurance policy, etc.). Further, the one or more factors that used in determining the final insurance rate may be provided to the user to provide rate transparency.

Figure 4:
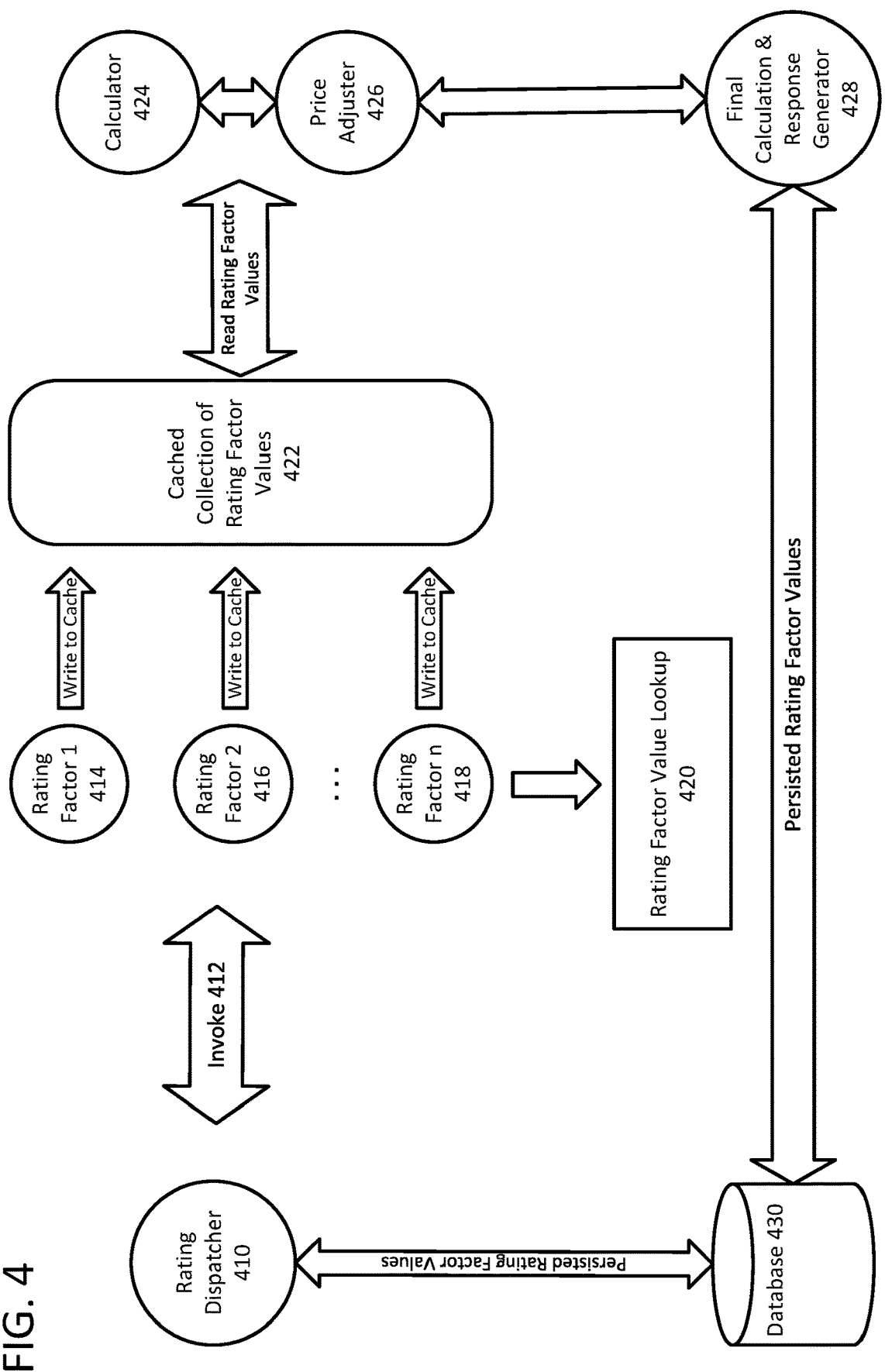
FIG. 4 shows an example of a logical flow for calculating an insurance rate according to one or more aspects of the disclosure.

FIG. 4 shows an example of a logical flow for a server-side application calculating an insurance rate according to one or more aspects of the disclosure. As noted above, the server-side application may receive a plurality of inputs from a user seeking a rate quote. A rating dispatcher 410 may receive the plurality of inputs. As an initial step, rating dispatcher 410 may query database 430 to determine whether the user has requested a rate quote before. If so, database 430 may respond with the prior rate quote and/or one or more persistent rating factors, which may be used to provide an updated rate quote for the user. In this regard, the one or more persistent rating factors may serve as a starting point for calculating the updated rate quote. Using the one or more persistent rating factors may ensure rating persistence. That is, the one or more persistent rating factors may ensure that the requested rate quote is equal to, or similar to, prior rate quotes.

Based on the plurality of inputs from the user and/or the one or more persistent rating factors, the rating dispatcher 410 may invoke one or more microservices in 412. The one or more microservices may operate in parallel to obtain a first rating factor 414, a second rating factor 416, and/or a third rating factor 418. It will be appreciated that more, or fewer, rating factors may be obtained from the plurality of user inputs and/or the one or more persistent rating factor values. The one or more microservices may use the plurality of rating factors to perform rating factor value lookup 420. Once obtained, the plurality of rating factor values may be stored in a cache to produce a cached collection of rating factor values 422. The plurality of rating factor values may be read from the cache, for example, when calculating one or more partial rates. For example, calculator 424 (which may be any of the microservice calculators) may read one or more rating factor values in determining a partial rate. A rate quote may be produced, for example, by premium calculator. The price adjuster 426 may modify, adjust, and/or alter the rate quote. Based on the adjusted rate quote, final calculation and response generator 428 may generate a final insurance rate and/or a response to the user with a final insurance rate. As noted above, the response may include an option to purchase an insurance product. Additionally or alternatively, the response may comprise a detailed breakdown of how the rate was calculated and/or how each rating factor impacted the final insurance rate. The rating factors used to determine the final insurance rate may be stored in database 430 as persistent rating factors.

Figure 5:
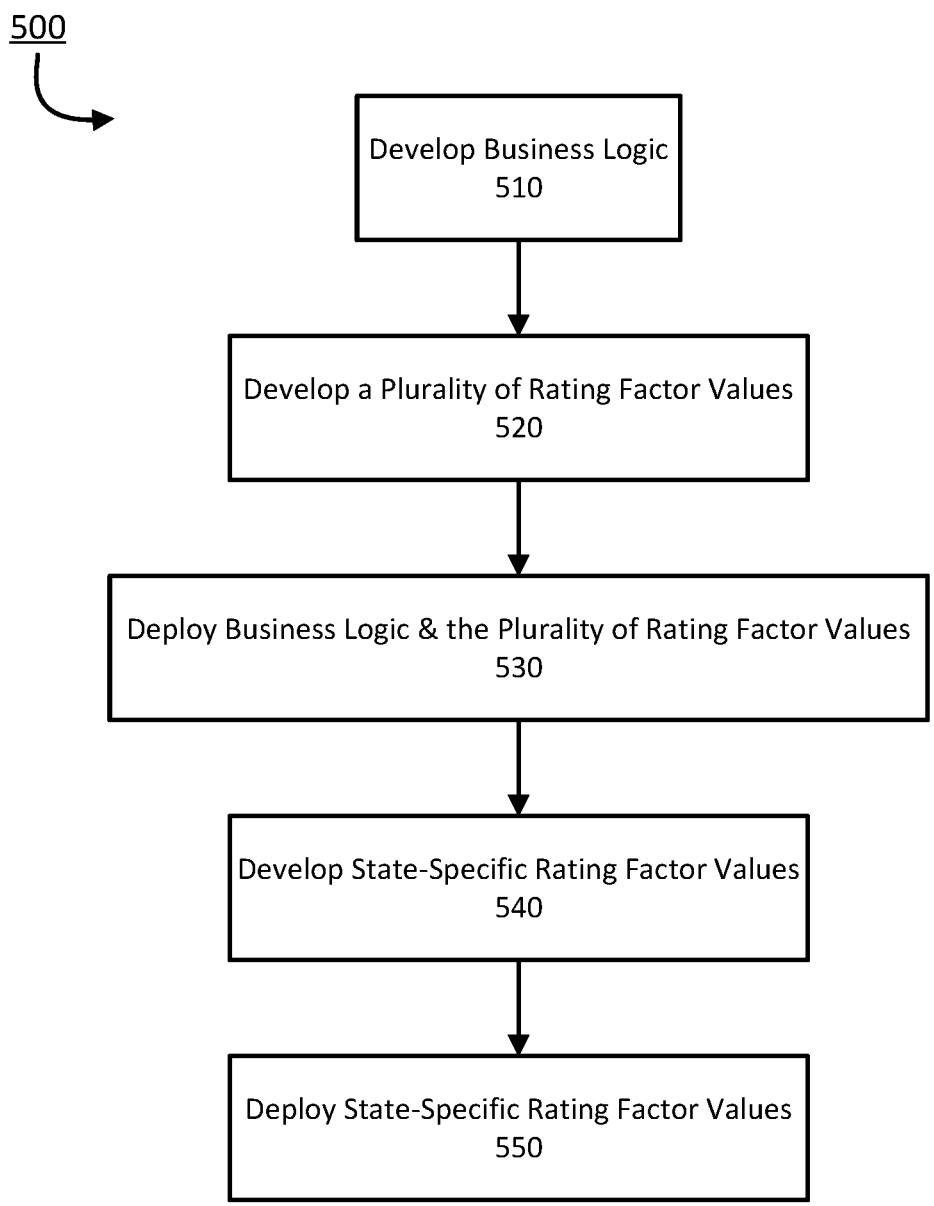
FIG. 5 shows an example of a flowchart for deploying one or more microservices in accordance with one or more aspects of the disclosure.

As noted above, an insurance company may develop one or more applications to calculate insurance rate quotes. The one or more applications may include one or more microservices to aid in the insurance rate quote calculations. FIG. 5 shows a flow chart of a process 500 for deploying one or more microservices according to one or more aspects of the disclosure. Some or all of the steps of process 500 may be performed using one or more computing devices, such as server 140.

In step 510, business logic for determining insurance rates may be developed. The business logic may include countrywide and/or state specific coverages. The business logic may define the processes for how insurance rates are calculated. In step 520, a plurality of rating factor values may be developed. The plurality of rating factor values may be determined as weighting values used to calculate partial rates that contribute to the final insurance rate. The plurality of rating factor values may be generalized and apply on a countrywide basis. In step 530, the business logic and the plurality of rating factor values may be deployed. In this regard, the business logic and/or the plurality of rating factor values may be installed and made active on one or more backend servers used by the insurance company in determining rate quotes. In step 540, one or more state-specific rating factor values may be developed. The state-specific rating values may be tailored to state requirements for insurance rates. In this regard, the state-specific rating values may control when both state-specific rating factor values and more generalized rating factor values exist. In step 550, the state-specific rating factor values may be deployed. As discussed above, deploying the state-specific rating factor values may comprise installing and/or making the state-specific rating factor values active on one or more backend servers used by the insurance company in determining rate quotes. In some instances, the state-specific rating factor values may be a limited deployment to specific backend servers that process requests from the state associated with the state-specific rating factor values.

Figure 6:
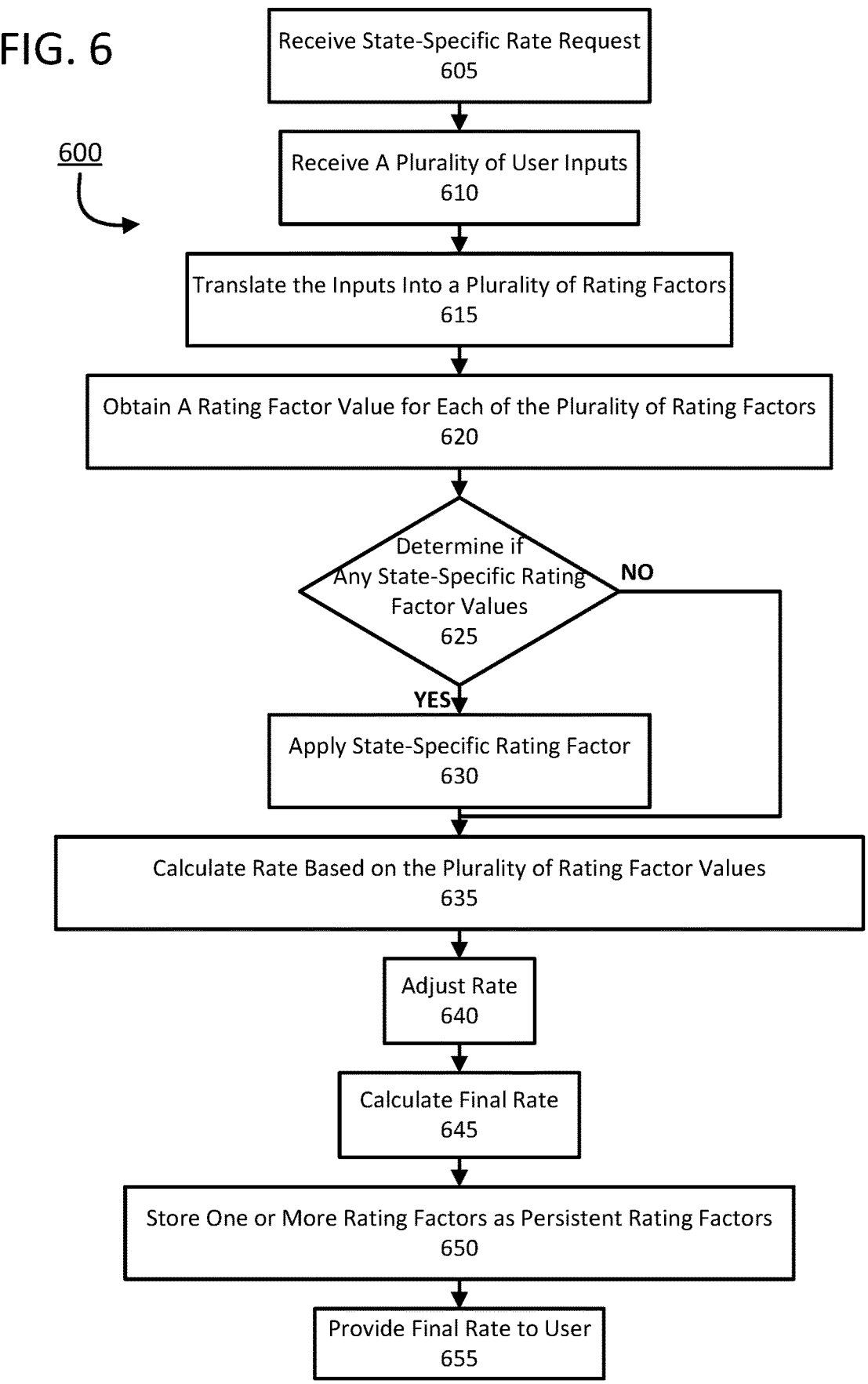
FIG. 6 shows an example of a flowchart for calculating an insurance rate using one or more microservices according to one or more aspects of the disclosure.

Users, such as customers, may request a state-specific insurance rate, for example, for an auto insurance policy. FIG. 6 shows a flow chart of a process 600 for calculating an insurance rate using one or more microservices according to one or more aspects of the disclosure. Some or all of the steps of process 600 may be performed using one or more computing devices, such as server 140.

In step 605, a server (e.g., one or more rate calculation applications executing on server 140) may receive a request for a state-specific rate request. The state-specific rate request may be related to an inquiry for an insurance product, such as an auto insurance policy and/or a boat insurance policy. In step 610, the server may receive a plurality of user inputs. In some instances, the plurality of user inputs may be received concurrently with the state-specific rate request. As noted above, the plurality of user inputs may comprise personally identifiable information (PII). As noted above, the user inputs may include additional information related to the type of rate quote sought by the user.

In step 615, the server (e.g., one or more rate calculation applications executing on server 140) may translate each of the plurality of user inputs into a plurality of rating factors. In step 620, the server may obtain a rating factor value for each of the plurality of rating factors. As discussed above with respect to FIG. 3, rating factor values may be a number between 0 and 1 that is used to calculate a partial rate. The server may query a look-up table, such as a rate worksheet, using each of the plurality of rating factors to determine the corresponding rating factor values. In step 625, the server may determine whether any state-specific rating factor values are present. If not, process 600 proceeds to step 635, where the microservices calculate a plurality of partial rates in parallel. A final rate may be calculated, as described above with respect to FIG. 3. However, if state-specific rating factor values are present, process 600 proceeds to step 630 where the server (e.g., one of the microservice calculators executing on server 140) may apply the state-specific rating factor value. In this regard, state-specific rating factors, rating factor values, and/or rules control over more general (e.g., countrywide) rating factors, rating factor values, and/or rules.

In step 635, the server (e.g., one or more rate calculation applications executing on server 140) may calculate one or more rates (e.g., partial rates) based on the plurality of rating factor values. As noted above, the one or more rating factor values may be stored in a cache. The one or more microservices may obtain the rating factor values stored in the cache and calculate a partial rate. A microservice calculator may aggregate a plurality of partial rates to determine an insurance rate. In step 640, the insurance rate may be adjusted, for example, using the rate adjuster described herein. In step 645, a microservice (e.g., the premium calculator) may calculate a final rate based on the response and/or feedback provided by the rate adjuster. In step 650, the one or more rating factors and/or rating factor values may be stored as persistent rating factors and/or persistent rating factor values. In step 655, the final insurance rate may be provided to the user. As discussed above, the final insurance rate may be sent (e.g., transmitted) to a user-side application, displayed to the user, and/or provided with an option to purchase an insurance product (e.g., a home policy, an auto policy, a life insurance policy, etc.).

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although many example arrangements described herein are discussed in the context of insurance applications, aspects described herein may be used in different industries and for different applications or products without departing from the invention. Further, although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
   receiving, by a computing device, a request for an insurance quote, wherein the request comprises a plurality of user inputs received via an application programming interface (API) proxy interface;
   translating, by the computing device and via one or more calculation components communicably coupled to the API proxy interface, the plurality of user inputs into a plurality of rating factors, wherein the plurality of rating factors are translated into a standardized format for processing;
   determining, by the computing device and via the one or more calculation components, a rating factor value for each of the plurality of rating factors by querying a look-up table stored in memory;
   storing, in the memory, the plurality of rating factor values;
   retrieving, via the one or more calculation components using a plurality of microservices executed in parallel, the plurality of rating factor values from the memory, wherein each of the plurality of microservices may retrieve one or more of the rating factor values stored in a database;
   calculating, by the computing device and via the one or more calculation components using the plurality of microservices, a plurality of partial rates based on the rating factor values, respectively;
   aggregating, by the computing device and via a rates API component communicably coupled to the one or more calculation components, the plurality of partial rates calculated using the plurality of microservices into an insurance rate; and
   causing the computing device to display, via the API proxy interface, a response to the request for the insurance quote, wherein the response comprises the insurance rate, wherein the response comprises a detailed breakdown including one or more of the plurality of rating factors used to calculate the insurance rate and a corresponding impact of the one or more of the plurality of rating factors on the insurance rate.

2. The method of claim 1, further comprising:
   determining, by the computing device, whether the request for the insurance quote and the plurality of user inputs comply with a canonical data model; and
   transforming, based on a determination that the request for the insurance quote and the plurality of user inputs do not comply with the canonical data model, the request for the insurance quote and the plurality of user inputs into a format that complies with the canonical data model.

3. The method of claim 2, further comprising:
   transforming the response and the insurance rate into a second format configured for an application that transmitted the request for the insurance quote.

4. The method of claim 1, wherein the rating factor value comprises a number between 0 and 1 that is used to calculate the partial rate.

5. The method of claim 1, further comprising:
   providing an indication of the stored rating factor values to a user.

6. The method of claim 1, wherein the memory is a database or a distributed cache.

7. The method of claim 1, further comprising:
   adjusting, by the computing device and using a price adjuster, the insurance rate prior to providing the response to the request for the insurance quote.

8. A computing device comprising:
   one or more processors; and
   memory storing instructions that, when executed by the one or more processors, cause the computing device to:
      receive a request for an insurance quote, wherein the request comprises a plurality of user inputs received via an application programming interface (API) proxy interface;
      translate the plurality of user inputs into a plurality of rating factors via one or more calculation components communicably coupled to the API proxy interface, wherein the plurality of rating factors are translated into a standardized format;
      determine a rating factor value for each of the plurality of rating factors via the one or more calculation components and by querying a look-up table stored in the memory;
      store, in a database, the plurality of rating factor values;
      retrieve, via the one or more calculation components using a plurality of microservices executed in parallel, the plurality of rating factor values, wherein each of the plurality of microservices may obtain one or more of the rating factor values stored in the database;
      calculate, via the one or more calculation components using the plurality of microservices, a plurality of partial rates based on the rating factor values;
      aggregate the plurality of partial rates calculated using the plurality of microservices into an insurance rate via a rates API component communicably coupled to the one or more calculation components; and
      causing the computing device to display a response to the request for the insurance quote via the API proxy interface, wherein the response comprises the insurance rate, wherein the response comprises a detailed breakdown including one or more of the plurality of rating factors used to calculate the insurance rate and a corresponding impact of the one or more of the plurality of rating factors.

9. The computing device of claim 8, wherein the instructions, when executed by the one or more processors, cause the computing device to:
  determine whether the request for the insurance quote and the plurality of user inputs comply with a canonical data model; and
  transform, based on a determination that the request for the insurance quote and the plurality of user inputs do not comply with the canonical data model, the request for the insurance quote and the plurality of user inputs into a format that complies with the canonical data model.

10. The computing device of claim 8, wherein the instructions, when executed by the one or more processors, cause the computing device to:
  transform the response and the insurance rate into a format configured for an application that transmitted the request for the insurance quote.

11. The computing device of claim 8, wherein the rating factor value comprises a number between 0 and 1 that is used to calculate the partial rate.

12. The computing device of claim 8, wherein the instructions, when executed by the one or more processors, cause the computing device to:
  adjust, using a price adjuster, the insurance rate prior to providing the response to the request for the insurance quote.

13. One or more non-transitory media storing instructions that, when executed by one or more processors, cause the one or more processors to perform operations comprising:
  receiving a request for an insurance quote, wherein the request comprises a plurality of user inputs received via an application programming interface (API) proxy interface;
  translating the plurality of user inputs into a plurality of rating factors via one or more calculation components communicably coupled to the API proxy interface, wherein the plurality of rating factors are translated into a standardized format for processing;
  determining a rating factor value for each of the plurality of rating factors via the one or more calculation components and by querying a look-up table stored in memory;
  storing, in the memory, the plurality of rating factor values;
  retrieving, via the one or more calculation components using a plurality of microservices executed in parallel, the plurality of rating factor values from the memory, wherein each of the plurality of microservices may retrieve one or more of the rating factor values stored in a database;
  calculating, via the one or more calculation components using the plurality of microservices, a plurality of partial rates based on at least one rating factor value, the plurality of microservices calculating, in parallel, the plurality of partial rates, respectively;
  aggregating the plurality of partial rates calculated using the plurality of microservices into an insurance rate via a rates API component communicably coupled to the one or more calculation components; and
  causing the one or more processors to display a response to the request for the insurance quote via the API proxy interface, wherein the response comprises the insurance rate, wherein the response comprises a detailed breakdown including one or more of the plurality of rating factors used to calculate the insurance rate and a corresponding impact of the one or more of the plurality of rating factors.

14. The one or more non-transitory media of claim 13, further comprising instructions that cause the one or more processors to perform operations comprising:
  determining whether the request for the insurance quote and the plurality of user inputs comply with a canonical data model; and
  transforming, based on a determination that the request for the insurance quote and the plurality of user inputs do not comply with the canonical data model, the request for the insurance quote and the plurality of user inputs into a format that complies with the canonical data model.

15. The one or more non-transitory media of claim 13, further comprising instructions that cause the one or more processors to perform operations comprising:
  transforming the response and the insurance rate into a format configured for an application that transmitted the request for the insurance quote.

16. The one or more non-transitory media of claim 13, wherein the rating factor value comprises a number between 0 and 1 that is used to calculate the partial rate.

17. The one or more non-transitory media of claim 13, further comprising instructions that cause the one or more processors to perform operations comprising:
  adjusting, using a price adjuster, the insurance rate prior to providing the response to the request for the insurance quote.

* * * * *